United States Patent [19]

Hahn et al.

[11] Patent Number: 5,196,905
[45] Date of Patent: Mar. 23, 1993

[54] RADIO FREQUENCY EXCITED RING LASER GYROSCOPE

[75] Inventors: Tae W. Hahn, North Hollywood; Salim N. Jabr, Woodland Hills, both of Calif.

[73] Assignee: Litton Systems, Inc., Beverly Hills, Calif.

[21] Appl. No.: 517,644

[22] Filed: Apr. 6, 1990

Related U.S. Application Data

[63] Continuation of Ser. No. 218,405, Jun. 22, 1988, abandoned.

[51] Int. Cl.$^5$ .................. H01S 3/05; G01C 19/64; G01B 9/02; G01P 9/00
[52] U.S. Cl. ..................... 356/350; 372/94; 372/87
[58] Field of Search ............... 372/94, 87, 64, 137, 372/82; 356/350

[56] References Cited

U.S. PATENT DOCUMENTS

| | | | |
|---|---|---|---|
| 3,395,367 | 7/1968 | Bell et al. | 331/94.5 |
| 3,521,119 | 3/1971 | Ahmed et al. | |
| 3,575,667 | 4/1971 | Smith | 372/94 |
| 3,602,837 | 8/1971 | Goldsborough | |
| 3,614,657 | 12/1972 | Hattori | |
| 3,772,611 | 11/1973 | Smith | |
| 3,873,388 | 3/1975 | Gabriel | |
| 4,115,004 | 9/1978 | Hutchings et al. | |
| 4,169,251 | 9/1979 | Laakmann | 372/64 |
| 4,213,705 | 7/1980 | Sanders | 356/350 |
| 4,368,092 | 1/1983 | Steinberg et al. | |
| 4,397,025 | 8/1983 | Kebabian | 372/20 |
| 4,435,808 | 3/1984 | Javan | 372/94 |
| 4,475,199 | 10/1984 | Sanders et al. | 372/37 |
| 4,477,188 | 10/1984 | Stiles et al. | 372/94 |
| 4,482,249 | 11/1984 | Smith, Jr. et al. | |
| 4,596,018 | 6/1986 | Gruber et al. | 372/61 |
| 4,612,647 | 9/1986 | Norvell | |
| 4,616,929 | 10/1986 | Bernelir et al. | 356/350 |
| 4,705,398 | 11/1987 | Lim et al. | 372/94 |

FOREIGN PATENT DOCUMENTS 2180094 3/1987 United Kingdom.
2185846A 7/1987 United Kingdom.
2194380 3/1988 United Kingdom.

OTHER PUBLICATIONS

Sanders et al., "Properties of . . . Ring Laser Gyro"; IEEE, 1979, CH-1449-Aug./1979, pp. 2-6.

MacAlpine, "Coaxial Resonators with Helical Inner Conductor", *Proceedings of the IRE*, Dec. 1959 (2099-2105, 2100).

Javan, "Population Inversion & Continuous Optical Maser Oscillation in a Gas Discharge Containing a He-Ne Mixture", *Physical Review Letters*, vol. 6, No. 3, pp. 106-110 (1961).

Goldsborough, "RF Induction Excitation of CW Visible Laser Transitions in Ionized Gases", *Applied Physics Letters*, vol. 8, No. 6, pp. 137-139, 15 Mar. 1966.

Smith, "A Waveguide Gas Laser", *Applied Physics Letters*, vol. 19, No. 5, pp. 132-134 (Sep. 1971).

Ed. Monto Ross, *Laser Applications*, pp. 133-200 (Academic Press, 1971).

Chow, "Multioscillator Laser Gyros", *IIEE, Journal of Quantum Electronics*, vol QE-16 (No. 9), pp. 918-936 (Sep. 1980).

Ed. M. L. Stitch, *Laser Handbook*, vol. 4, pp. 230-232 (North Holland, 1985).

*Primary Examiner*—Nelson Moskowitz
*Attorney, Agent, or Firm*—L. David Rish; M. Michael Carpenter

[57] ABSTRACT

A radio frequency excitation system is disclosed for use in conjunction with a ring laser gyroscope. The radio frequency excitation system is comprised of a closed resonant cavity which surrounds a helical coil driven at a high radio frequency at a range of 5 to 550 megahertz. This closed resonant coil surrounds one leg of a ring laser gyroscope which is carved out and exposed so that it may be surrounded by the resonant cavity. Using such a radio frequency excitation system eliminates the need for high power DC discharge components such as cathodes and anodes, as well as problems inherent with properly sealing the cathodes and anodes to the monolithic frame of the ring laser gyroscope.

11 Claims, 4 Drawing Sheets

RADIO FREQUENCY EXCITED RING LASER GYROSCOPE

This is a continuation of application Ser. No. 218,405, filed Jun. 22, 1988, now abandoned.

BACKGROUND OF THE INVENTION

1. Field of the Invention

This invention relates to optical rotation sensors; and, particularly, this invention relates to ring laser gyros, having an active medium gain that is excited by a radio frequency signal emitted from a helical resonator within an enclosed cavity.

2. Description of the Related Art

Ring laser gyroscopes are a class of optical rotation sensors that have been developed to provide an alternative form of rotational measurement to the mechanical gyroscope. A ring laser gyroscope employs the Sagnac effect to detect rotation. A basic two mode ring laser gyroscope has two independent counter rotating light beams which propagate in an optical ring cavity. These two light beams propagate in a closed loop with transit times that differ in direct proportion to the rotation rate of the loop about an axis perpendicular to the plane of the loop. Besides the planar ring laser gyro, other path geometries have been used; for example, a non-planar gyroscope has been disclosed in U.S. Pat. No. 4,482,249 to Dorschner, which teaches an out-of-plane light path that provides the reciprocal splitting of two pairs of counter rotating beams. This out-of-plane gyroscope has been known in the literature as the multioscillator ring laser gyroscope.

Yet another alternative to the multioscillator ring laser gyroscope is the split gain multi-mode ring laser gyroscope and method disclosed in a pending patent application to Graham Martin, No. 115,018, filed Oct. 28, 1987, assigned to the common assignee of this application. (Placed under Secrecy Order May 17, 1988). Both the multioscillator ring laser gyroscope and the Split Gain Multi-Mode Ring Laser provide out-of-plane geometry and at least two pairs of counter propogating modes of light beams to measure rotation with respect to an inertial frame of reference. These non-planar gryos have been developed to avoid the need for mechanical dithering. Dithering is needed in planar gyroscopes to prevent counter rotating travelling waves from locking at low rotation rates.

Heretofore, ring laser gyros have operated using at least a dome-like configured metallic or glass covered metallic cathode and at least two anodes, which extend outward from the monolithic glass body of the ring laser gyro to excite the gas medium contained within the gyroscope. A DC discharge has been used which excites gas contained in the ring laser gyro pathway between the cathodes and each of the anodes.

FIG. 1 shows a prior art planar DC-excited ring laser gyro. The ring laser gyroscope 10 is formed from a monolithic glass body such as Zerodur, which is a trademark of the Schott Glass Works Co. of West Germany. A similar glass that may be used as the ring laser gyro 12 is manufactured under the trademark "CERVIT" sold by Owens-Illinois. Both materials are mixtures of glass and ceramic that have opposite temperature expansion coefficients, thus providing an overall minimal dimensional changes over a wide range of temperatures.

A square optical pathway 14 is defined within the gyroscope 10 by 4 legs, 16, 18, 20, and 22. Leg portion 18A, 22, and 20A form a segment of the optical pathway which glows due to the DC discharge between the cathode 24 and the respective anodes 26 and 28. During manufacture, a gaseous mixture of helium and two isotopes of neon provide an active medium that is excited along the DC discharge path defined by segments 18A, 22, and 20A.

Gas is provided to the cavity during manufacture by the fill stem 30 through the anode 26. The cathode is generally grounded, while the anode potentials are each brought up to 1500 volts, through use of a balast resistor 32. At each corner of the pathway 14, a mirror is positioned to reflect light around the ring laser gyro. The mirrors, 34, 36, 38, and 40 are mounted to the frame 12. A more detailed description of the operation of the planar ring laser gyro together with the particular manner of DC excitation is also described in U.S. Pat. Nos. 4,115,004 to Hutchings and 4,612,647 to Norvell, each patent being assigned to the common assignee of this application.

In addition to the high voltage and high current regulation requirements needed for DC excitation, a number of problems have been associated with the manufacture and reliability of DC discharge ring laser gyroscopes. A prime problem is that of Langmuir flow which can cause a biased and therefore inaccuracies in the rotational sensing capabilities of the ring laser gyro, unless the gyroscope is provided with two balanced current discharge paths. A discharge between a single anode and cathode causes the molecules in a gas laser cavity to flow in a preferred direction. This flow gives rise to a bias or inaccuracy in the rotational sensing capability of a ring laser gyroscope, since each of the clockwise and anti-clockwise modes of light beams propogating in the cavity will be influenced differently by this flow phenomena. In a DC discharge excitation mechanism, as illustrated in FIG. 1, the only manner of offsetting the bias problem is to exactly balance the currents and lengths of the two discharge legs 18A and 20A in each half of the discharge region. This is a difficult and costly process. The power supplies associated with DC excitation are expensive and bulky. A 3-4,000 volt potential is necessary to start the discharge processs, and continued operation of the discharge requires a high voltage source of 1500 volts. The cathodes and anodes themselves have associated problems including leaks at the seals and shortened lifetimes.

Also, a phenomenom known as cathode sputtering arises and limits the lifetime of the discharge system. Cathode sputtering is characterized by the degradation of a protective oxide coating on the outside of the cathode for a good part of its life. The discharge process eventually eats through the oxide coating, exposing the underlying aluminum of the cathode. Once this aluminum is exposed, cathode life deteriorates very quickly and results in an inoperative or non-usable laser structure. This cathode sputtering is a severe limitation on the life of a gas ring laser gyroscope. Also there are instabilities in the discharge when the DC discharge is initially activated after filling the ring lasers with gas during manufacture.

In certain ranges of current operation, instabilities in the current and voltage discharge arise. These instabilities limit the range of current and gas pressure that can be used with a DC discharge ring laser gyroscope. Also, the DC discharge process is relatively inefficient in providing high energy electrons to pump the gas laser atomic energy level. Some of the problems associated with DC discharge in a ring laser gyroscope are also described in *Laser Applications,* edited by Monte Ross, pages 133-200 (Academic Press, 1971).

In addition to the operation of the planar ring laser gyro through DC discharge as shown in FIG. 1, the operation of the multioscillator laser gyroscopes, as described in an article by Chow, et. al., at pages 918-936, IEEE Journal of Quantum Electronics, vol. QE-16, No. 9, September 1980 is discussed in this article. In both the out-of-plane and Zeeman effect multioscillator ring laser gyroscopes, it is preferred that the active medium not interfere with certain axially uniform fields needed for the operation of these types of ring laser gyroscopes. As with the planar ring laser gyroscope, DC discharge methods have created similar problems for multioscillator ring laser gyroscopes. Likewise, the Split Gain Multi-Mode Ring Laser Gyro, described in U.S. patent application 115,018, filed Oct. 28, 1987, would preferably confine the active medium to the area where a uniform magnetic field is also applied (under Secrecy Order issued May 17, 1988). This is not easily accomplished with DC excitation.

For all the foregoing reasons, an alternative method of excitation of the gain medium of a ring laser gyroscope is desirable.

In the past, alternative methods of excitation of a laser gas medium have been attempted with varying degrees of success. RF excitation of a helium neon mixture has been reported as early as 1961 in Physical Review Letters, vol. 6, No. 3, pages 106-110, in an article by A. Javan. J. P. Goldsborough has described an RF induction excitation of a continuous wave visible laser in vol. 8, No. 6 of Applied Physics Letters, Mar. 15, 1966), pages 137-139.

Smith U.S. Pat. No. 3,772,611, assigned to Bell Telephone Laboratories, issued Nov. 13, 1973, describes an RF excited ring type capallary tube 11 (FIG. 1) which may have utility as a rotation rate sensor. The '611 patent, however, does not teach an efficient design for utilizing the RF excitation. This '611 patent also referred to "A Wave Guide Gas Laser" in an article dated Sep. 1, 1971, in vol. 19, Applied Physics Letters, No. 5, pages 132-134. In this article, Smith described a combined RF and DC voltage excited capillary wave guide containing a mix of helium neon gas.

These inductive coupled RF excitation methods were by necessity high power and created substantial electrical interference and noise which disturbed other instrumentation associated with rotation sensing.

UK patent application published Jul. 19, 1987 (GB 2185846A) discloses a ring laser which is excited by transverse electrical discharge operating at a high frequency alternating voltage. Although this disclosure claims a low voltage excitation range, it operates through capacitive coupling to the gaseous medium in a transverse direction to the passageway between the mirrors. Use of this transverse direction-excited, high frequency, alternating voltage, capacitively coupled to the active medium would result in contamination of the passageways of the ring laser gyroscope cavity due to the constant bombardment of the gaseous media against the walls and the high RF powers needed to drive the discharge. This is counter-productive to a long life operation of a ring laser gyroscope.

Thus, although the prior art referenced have disclosed alternative methods of excitation other than DC discharge for gaseous laser and ring laser gyroscopes, these alternative solutions to the problem of DC discharge have been inadequate.

SUMMARY OF THE INVENTION

Disclosed herein is a radio frequency excited ring laser gyroscope including a resonant closed cavity defining a closed optical path which is filled with a gain medium. The ring laser gyroscope of this invention includes a means for exciting the gas medium which comprises a resonant cavity formed around a helical coil for applying a radio frequency signal to excite the discharge of a gain medium. The high frequency signal that is imparted by the resonant cavity is in the range of 5 Mhz to 550 Mhz. A resonant means for applying a radio frequency signal for exciting a discharge of the gain medium should include a helical coil surrounding a portion of the closed optical path where the helical coil is contained within a closed conductive resonator shield. Along at least one leg of the monolithic dielectric body of the ring laser gyroscope a portion of the monolithic body is carved out to allow one of the tubular bores to be surrounded by the helical coil and enclosed in a conductive resonator shield. An RF oscillator is coupled and connected to the resonant means to supply a radio frequency signal to the resonant means for excitation of the active gain medium.

The advantages of the invention disclosed herein will become more apparent from a review of the accompanying drawings and detailed description of the preferred embodiment of this invention which follows.

DETAILED DESCRIPTION OF THE PREFERRED EMBODIMENT

Figure 1:
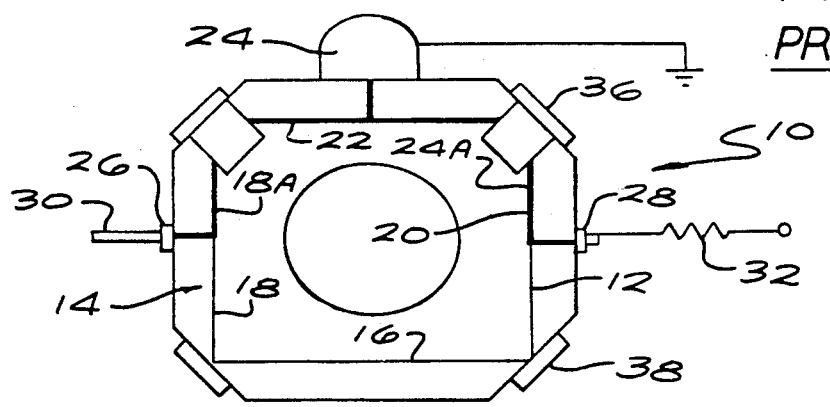
FIG. 1 shows a prior art configuration of a DC-excited planar ring laser gyro.
Figure 2:
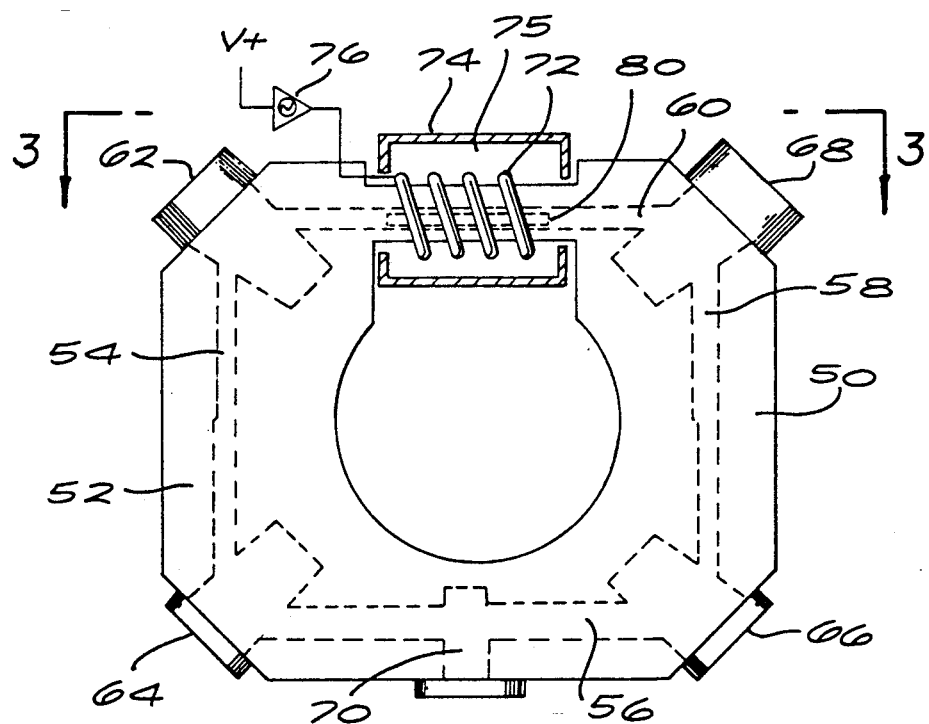
FIG. 2 shows a top plan view of a planar ring laser gyro that is radio frequency excited in accordance with the teachings of this invention.
Figure 3:
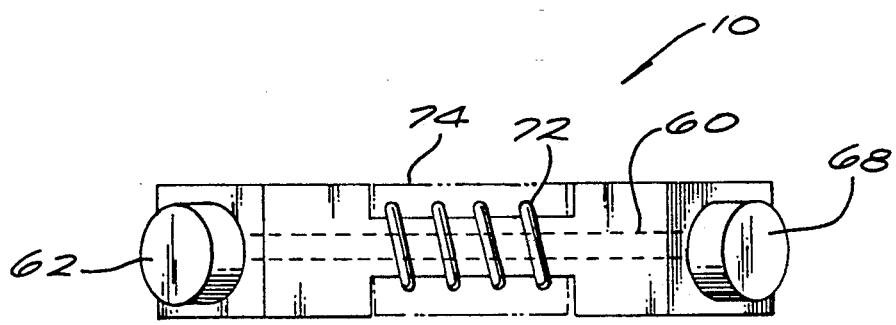
FIG. 3 shows a side elevational view of the planar radio frequency excited ring laser gyroscope.
Figure 4:
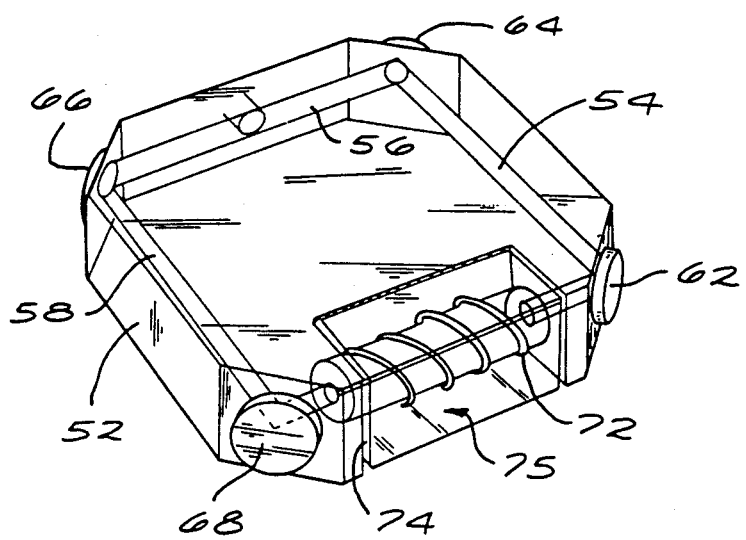
FIG. 4 shows a perspective view of a radio frequency excited planar ring laser gyroscope.

With reference to FIGS. 2, 3 and 4, a radio frequency excited planar ring laser gyroscope 50 is shown. The ring laser gyroscope is comprised of a low thermal expansion glass body 52 into which an optical pathway defined by legs 54, 56, 58 and 60. Positioned at each corner are mirrors 62, 64, 66 and 68. During manufacture, gas is introduced to the cavity defined by the legs through the passageway 70.

At least one of the legs 60 has been carved to accomodate the positioning of a helical coil 72 which is surrounded by a resonant cavity shield 74. The coil 72 is driven by an RF frequency oscillator 76 (FIG. 2) operating at a voltage of approximately 28 volts. The radio frequency oscillator 76 may be a modified Colpitts Oscillator. Generally, a signal in the range of 5 to 550 megahertz is imparted to the coil. By completely enclosing the coil 72 with a resonator cavity shield 74, a closed resonant cavity is formed which serves to amplify the signal produced within the cavity. In the preferred embodiment the resonant shield 74 should be of conductive material with low resistivity. The helical coil 72 is preferably formed from copper wire and the resonator shield made from copper tube to form the radio frequency resonant cavity. The shield could be formed from other metals coated on a tubular substrate such as, but not limited to, gold, silver or aluminum. The resonant cavity 75 encloses the portion of the gain medium 80 that is excited by the radio frequency discharge. By operating at the proper radio frequencies, the cavity may be run as a fullwave, halfwave, or quarter wave, length resonator. Readings of the electro magnetic field outside the resonator reveal that the cavity has localized the electro magnetic field. Any spurious signals have been reduced in order to minimize any undesirable effects of the electro magnetic far field on the operation of the ring laser gyroscope or related measuring electronic components. Thus, unlike radio frequency induced excitation as disclosed in the prior art, the use of a resonant cavity allows the optimization of a strong excitation with low power and minimal radio frequency interference (RFI).

An enclosed helical resonator, such as that shown in FIGS. 2-4, may provide high Q. The helical resonator assembly is comprised of a coil 72 within the resonator shield 74, where one end of the coil 72 is solidly connected to the shield 74. The other end of the coil 72 is an open circuit, except for a possible trimming capacitor (not shown). In this configuration, the resonator assembly resembles an L-C circuit; but, instead of being a lumped-constant device, its operation can be described in terms of distributed inductance, capacitance, and resistance. The resonator must be properly aligned for optimum performance. According to techniques known in the art (See W. W. MacAlpine, et. al., "Coaxial Resonators with Helical Inner Conductor," *Proceedings of the IRE*, December, 1959, pp. 2099-2105 at 2100), alignment of the resonator coil can be achieved according to the following equations:

$$Q_u = 50 D f_o^{\frac{1}{2}} \tag{1}$$

where:
Qu=unloaded Q;
D=inside diameter of the resonator shield; and,
$f_o$=Resonant frequency (Mhz).

$$N = 1900/(f_o D) \text{ turns}$$

where:
N=total number of windings
$f_o$=Resonant frequency <MHz>; and,
D=inside diameter of the resonator shield.
Additional considerations of parameters needed to achieve optimum RF coil operation have been treated in the conventional arts, as indicated by the MACALPINE Article, SUPRA.

Figure 5:
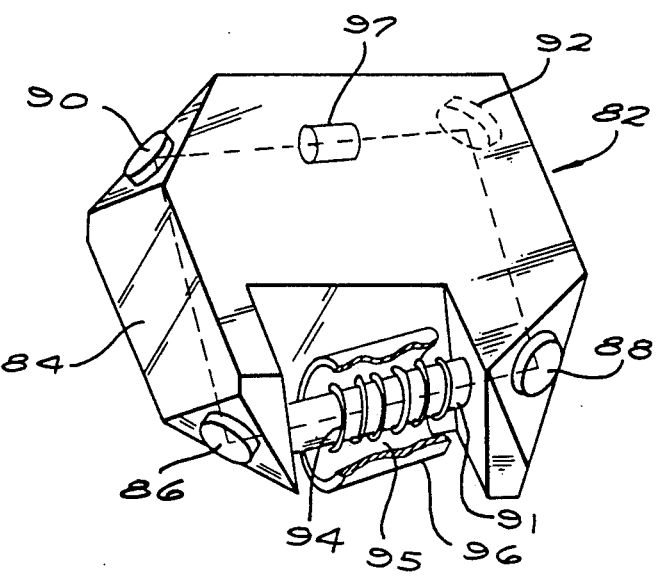
FIG. 5 shows an alternate embodiment of this invention wherein a multioscillator ring laser gyro is radio frequency excited in accordance with the teachings of this invention.

FIG. 5 shows an alternative embodiment of the radio frequency excitation system of this invention used in conjunction with a multioscillator ring laser gyroscope 82. As with the planar ring laser gyroscope, the frame 84 is made from a monolithic dielectric material having a low thermal expansion over a wide temperature range (between −50 deg. C.- 150 deg. C). As has been disclosed in the art, this form of multioscillator ring laser gyroscope is positioned in an out-of-plane configuration in order to provide reciprocal splitting between sets of left and right circular polarized beams of light. (A more detailed explanation may be found in the *Laser Handbook* Vol. 4, edited by M. L. Stitch, published by North Holland, 1985, pages 230-332). Heretofor, the multioscillator ring laser gyroscope has had its active medium excited by a DC discharge between a cathode and at least 2 anodes. An alternative form of excitation of the multioscillator ring laser gyroscope is shown in FIG. 5. One of the four legs, positioned between mirrors 86 and 88, of the out-of-plane multioscillator ring laser gyroscope 82 is carved out of the body. The passageway 91 defined by the leg between 86 and 88 is integral with the frame 84 and is preferably a cylindrical pathway. Wound around this pathway 91 is a Radio Frequency helical coil 94. Surrounding the coil 94 is preferably a cylindrical radio frequency resonator shield 96. Positioned on the leg opposite 91 between mirrors 90 and 92 is the optical rotator 97 (such as a Faraday rotator) which provides non-reciprocal splitting between clockwise and counter-clockwise beams of light within two sets of left and right circularly polarized beams in the presence of a uniform magnetic field.

It will be noted that the radio frequency resonator shield 96 provides good isolation for all signals generated within the helical coil 94 and the resonator cavity 95. By shielding the resonator cavity 95, the radio frequency resonator shield 96 prevents any radio frequency interference from affecting the detection circuitry or any other electronics.

Figure 6:
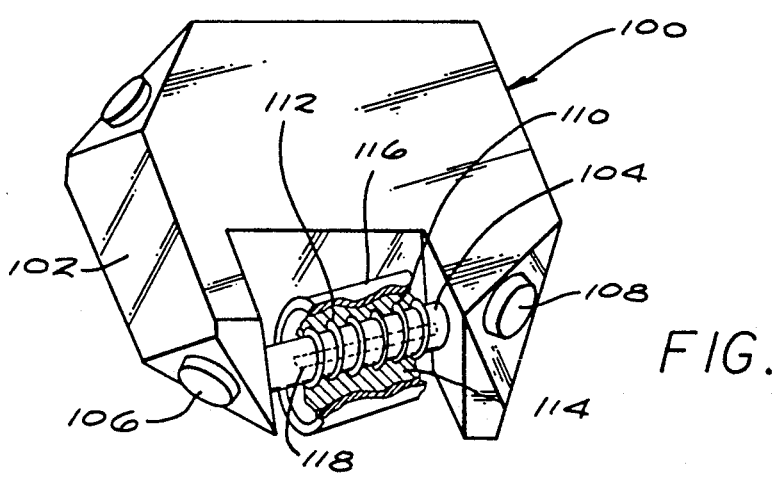
FIG. 6 is a perspective view of a multi-oscillator ring laser gyroscope showing, in partial section, the configuration of the radio frequency excitation mechanism used by a split gain multi-mode ring laser gyroscope in accordance with this invention.

With reference to FIG. 6, a Split Gain Multi-Mode Ring Laser Gyroscope 100 is shown. The frame 102 is a monolithic dielectric material at a low coefficient of thermal expansion. As was taught in the co-pending application Ser. No. 115,018, filed Oct. 28, 1987 (now under Secrecy Order) and assigned to the common assignee, the split gain multi-mode ring laser gyroscope is also configured in an out-of-plane configuration. A strong permanent magnet 116 is used to cause the split gain effect needed to operate this form of ring laser gyroscope. When the split gain gyroscope is operated by use of conventional DC discharge, a permanent magnet (not shown) must be positioned on a leg opposite the gain medium and the leg where the cathode is positioned. This is not, however, the most desirable positioning of the permanent magnet in the split gain multi-mode ring laser gyroscope.

Preferably, the split gain multi-mode ring laser gyroscope operates best when the active medium is contained within the permanent magnet 116. This is difficult to achieve when using a conventional DC discharge manner of medium excitation. The radio frequency excitation system of this invention provides an optimum alternative to the conventional DC discharge.

Again with reference to FIG. 6, the active medium discharge pathway 104 is positioned between mirrors 106 and 108. Within the pathway 104 gaseous medium (preferably a helium-neon mixture) is excited by use of a radio frequency helical coil which applies a radio frequency signal from an RF oscillator (not shown) to a resonant cavity 110 formed between the radio frequency helical coil 112 and the radio frequency resonator shield 114. The radio frequency resonator shield 114 may be a copper shield which surrounds copper wire forming the radio frequency helical coil 112. In order to provide compactness and optimum design, the radio frequency shield 114 may be positioned along the inner diameter of the permanent magnet 116 which also surrounds the medium passageway 110.

By configuring the radio frequency excitation system within the permanent magnet 116 as shown in FIG. 6, one is able to achieve optimum results with regard to both the excitation of the active medium 118 within the passageway 110 as well as the confinement of that medium 110 within the permanent magnet length 116, a necessary factor in achieving optimum split gain multi-mode ring laser gyroscope operation. Each signal then plays a different role. The high radio frequency signal imparted on the helical coil 112 is used to excite the active medium 118. The low DC signal applied simultaneously to the coil 112 is used to fine tune the magnetic field arising from the permanent magnet 116. Since the permanent magnet 116 is preferably a cylindrical configuration, the radio frequency resonator shield (114) should also be a concentric cylindrical shape within the inner of the permanent magnet 116.

In this manner, a radio frequency excited Split Gain Multi-Mode Ring Laser Gyroscope is disclosed which does not need independent DC magnets positioned on a leg away from the active medium 118, as is required in a DC excited split gain multi-mode ring laser gyroscope.

Figure 7:
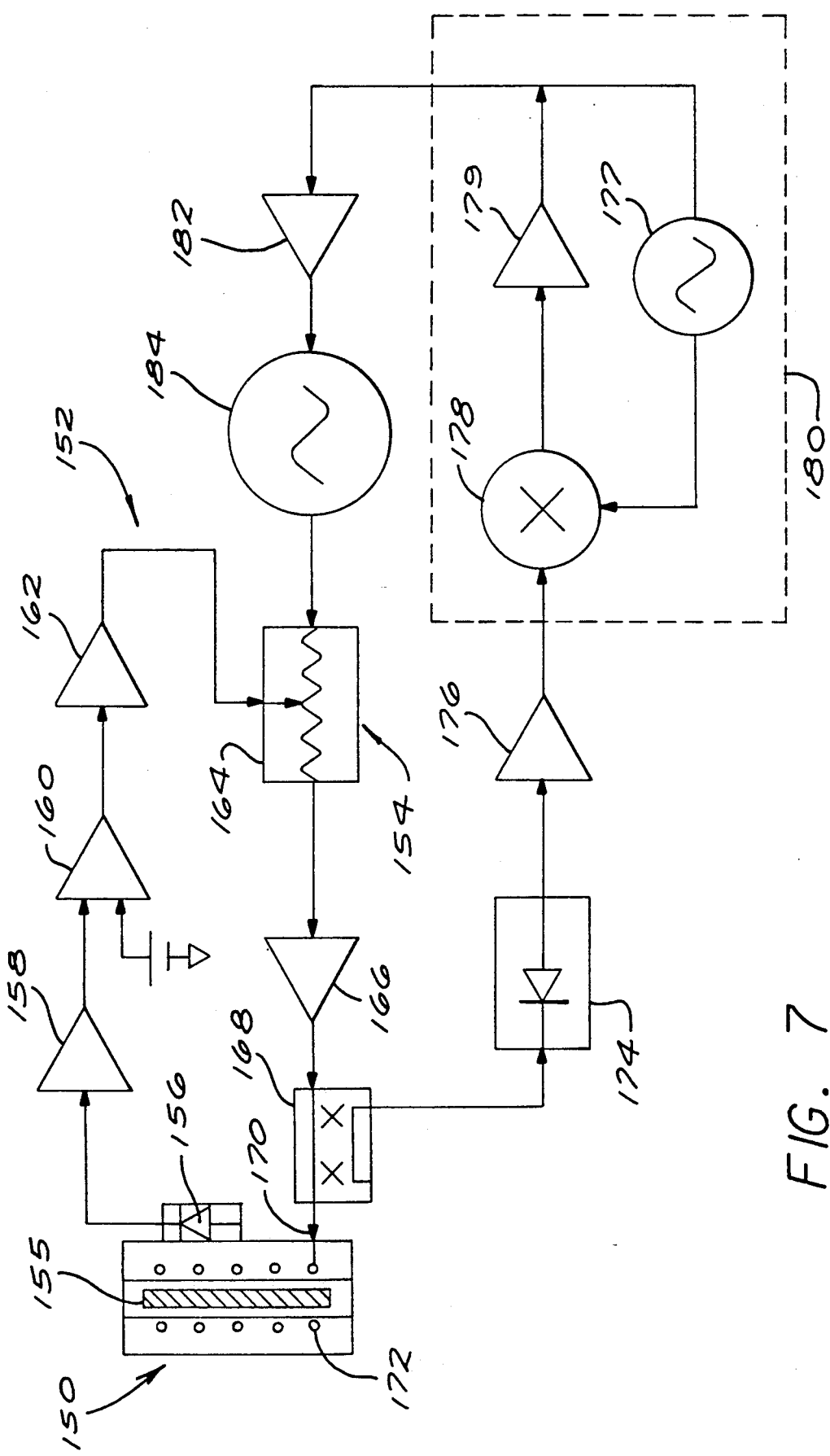
FIG. 7 is a schematic diagram showing the control electronics for the radio frequency excitation drive system for driving the resonator means in accordance with this invention.

FIG. 7 shows the control electronics for the radio frequency drive system. In order for the radio frequency excitation taught in this invention to operate most efficiently, the radio frequency resonator and coil system 150 must be regulated so that the excited medium is maintained at a relatively constant power level while the radio frequency resonator signal is maintained at a relatively constant frequency. The combination of electronic components shown generally in power control loop 152 controls the power provided to the radio frequency resonator 150, while the frequency control loop 154 controls the frequency of the signal drive in the radio frequency resonator 150.

The power control loop 152 receives an input signal through the photo-diode 156, in the form of light intensity of the gain medium 155. This signal is then amplified in the pre-amplifier 158 and provided as an output voltage signal to the differential amplifier 160. The differential amplier 160 compares the voltage power signal to a reference voltage. If the operating power voltage signal is higher than the reference, or lower than the reference, an output signal resulting from common mode rejection by the differential amplifier 160 provides an error signal input to the integrator 162. The integrator 162 then provides an output signal which controls the electronic attenuator 164 to adjust the voltage power supply provided to the radio frequency resonator.

The electronic attenuator 164 provides an output signal to the radio frequency amplifier 166 which couples its output signal to the radio frequency coupler 168. The resulting output at 170 will either raise or lower the power provided to the RF frequency coil 172 within the radio frequency resonator 150. Additionally, the frequency of the RF resonator 150 is monitored by the radio frequency coupler 168 and is detected by an amplitude modulator detector 174. The output from the detector 174 of the frequency control loop 154 is then amplified by the pre-amplifier 176.

The output of the pre-amplifier 176 is then provided to the phase lock loop 180. The phase lock loop 180 is comprised of synchronous detector 178, an integrator 179, and a local oscillator 177. (This is a known configuration for an analog phase lock loop). The phase lock loop 180 locks in on a frequency determined by the local oscillator 177 and the output of the phase lock loop 180 is then provided to the summing amplifier 182. The summing amplifier 182 then adjusts the voltage to the voltage controlled oscillator 184.

The voltage controlled oscillator 184 provides an output adjustment to the electronic attenuator 164 which in turn, as previously described, provides frequency control through the radio frequency coupler 168 to the frequency of the signal applied to the coil 172 of the RF resonator 150. In this manner, both power and frequency control and consistency are maintained.

If it is desired to operate the ring laser gyroscope at full wave resonance the gain medium 155 may be captured within the coil 172 of the RF resonator 150. The positioning of this gain medium 155 may be controlled by the electronics shown in FIG. 7; but, this is only one embodiment for accomplishing this goal. It would be known generally that a digital or other hybrid analog digital servo-system may also be used to control power and frequency of the RF resonator 150.

Figure 8A:
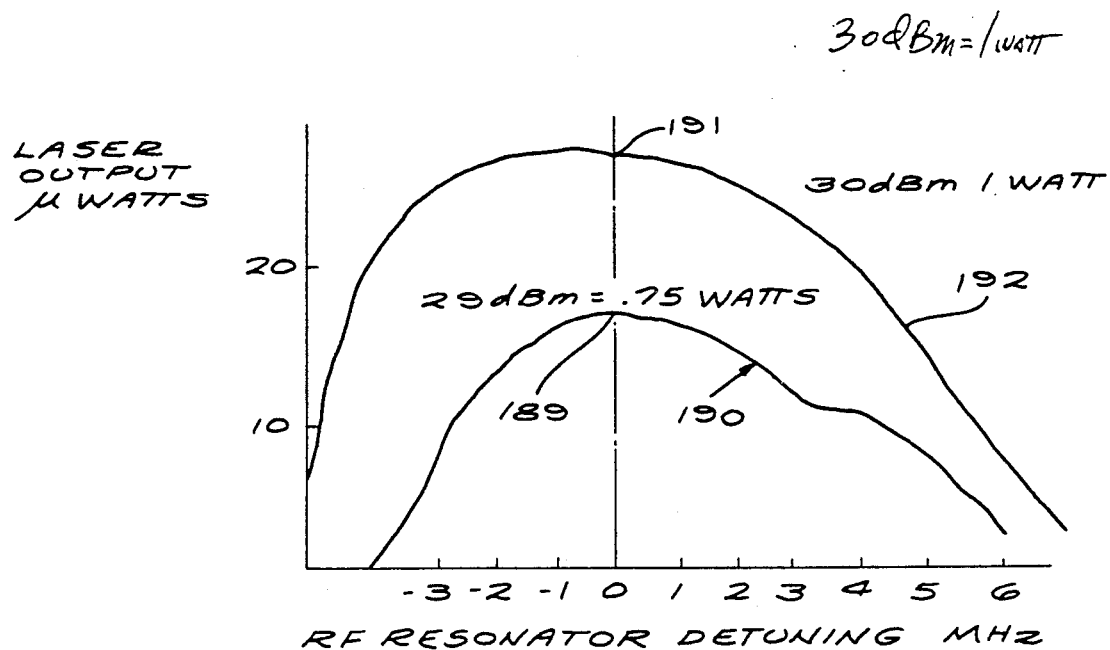
FIG. 8A and 8B show experimental test results derived from experiments conducted using a radio frequency excited ring laser gyroscope.
Figure 8B:
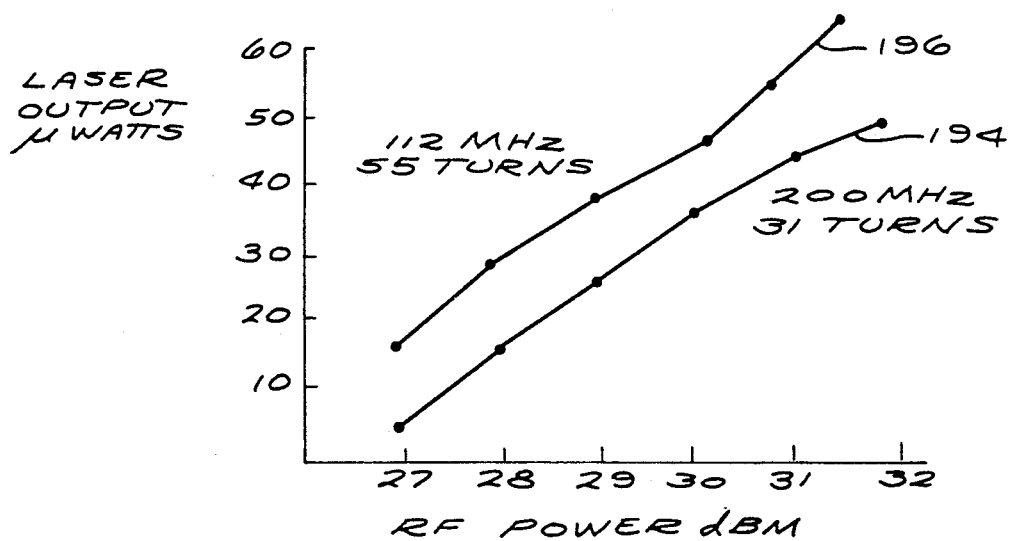

FIGS. 8A and 8B show the results of radio frequency excitation experiments for a planar ring laser gyroscope. When radio frequency excitation is applied to the ring laser gyroscope, curves 190 and 192 of FIG. 8A show that the optimum power is provided at the center of the radio frequency resonator tuning frequency at 189 and 191 respectively. Curve 190 is shown at 29 decibels referred to one milliwatt (dBm) or 0.75 watts, while curve 192 shows a 30 dBm input or 1 watt. In either case it can be shown that as one detunes the resonator from the central frequency only 3 Mhz lower or 6 Mhz higher, there is a significant drop off in excitation. Thus the fine tunability of the radio frequency excited gyroscope is shown in FIG. 8A. FIG. 8B shows that the power increases relatively linearly. As input power and voltage is increased from a 27 volt input to a 32 volt input, curves 194 and 196 show that the wattage output of the linear laser increases in a substantially linear fashion. Curve 194 exhibits the 200 Mhz signal with 31 turns while curve 196 shows a 112 Mhz signal with 55 turns. It thus can be seen from FIG. 8B that there is a linear relationship between output and input power that is smooth and provides a high optimum efficiency for excitation of the gain medium in the ring laser gyroscope.

While a preferred embodiment of the radio frequency excitation system for a variety of embodiments of ring laser gyroscopes have been shown, it is clear that alternative resonator configurations may be used. These configurations could also provide a low power, high efficiency output that is simple and avoids all the disadvantages of the traditional DC discharge medium excitation devices of the prior art. While preferred embodiments have been shown, alternative equivalent embodiments are intended to be covered in the appended claims which follow this disclosure.

What is claimed is:

1. A ring laser gyroscope, comprising:
   a resonant optical cavity formed within a monolithic block, said block defining a closed optical path, defined by at least three legs, having a gain medium therein; and,
   a closed Radio-Frequency cavity resonator positioned along a portion of said closed optical path, including at least one of said legs, which applies a localized longitudinal radio frequency signal for exciting discharge of the gain medium;
   said closed Radio-Frequency cavity resonator having a helical coil powered up by a power source exhibiting reduced power dissipation surrounding a portion of said closed optical path; and,
   said helical coil contained within an enclosed conductive resonator shield, said helical coil and enclosed conductive resonator shield forming a high-Q, distributed parameter coaxial Radio-Frequency resonator assembly, and substantially aligned according to the following equations:

$$Q_u = 50\ D\ f_o^{\frac{1}{2}};$$

and, $$N = (1900/f_o\ D)\ \text{turns};$$

where,
   $Q_u$ is unloaded Q (quality factor);
   D is the inside diameter of the resonator shield;
   $f_o$ is a resonant frequency (MHz) of said resonator assembly; and,
   N is the total number of windings of said helical coil.

2. The ring laser gyroscope of claim 1, wherein:
   said block is made from a dielectric material having a plurality of tubular bores connected end to end in a polygonal configuration defining said closed optical path;
   at least one side of said body being carved out to allow at least one of said tubular bores to be surrounded by said helical coil and enclosed conductive resonator shield;
   whereby discharge of the gain medium of the ring laser gyroscope is achieved.

3. The ring laser gyroscope of claim 1, wherein an RF oscillator is connected to said closed Radio-Frequency cavity resonator to supply said localized longitudinal radio frequency signal to said resonant optical cavity to achieve gain medium discharge within said ring laser gyroscope.

4. The ring laser gyroscope of claim 3, wherein the RF oscillator provides a radio frequency signal within a range of 5 to 550 megahertz.

5. The ring laser gyroscope of claim 1, wherein:
   said closed Radio-Frequency cavity resonator applies a localized longitudinal half wave radio frequency signal along a portion of said closed optical path for exciting discharge of the gain medium.

6. The ring laser gyroscope of claim 1, wherein:
   said closed Radio-Frequency cavity resonator applies a localized longitudinal quarterwave wave radio frequency signal along a portion of said closed optical path for exciting discharge of the gain medium.

7. The ring laser gyroscope of claim 1, wherein the helical coil of said closed Radio-Frequency cavity resonator is powered up by an RF oscillator system connected to said closed Radio-Frequency cavity resonator to supply radio frequency signals to said cavity resonator, said oscillator system including:
   an RF oscillator;
   means for regulating said RF oscillator to provide a radio frequency signal to said helical coil within a predetermined rane;
   said regulating means including frequency control means coupled to phase lock loop means, said phase lock loop means controlling regulation of frequency provided by said RF oscillator to said helical coil; and
   means for controlling power provided to said Radio-Frequency cavity resonator including photodetection means coupled to a signal comparator means, said signal comparator means adjusting an attenuator means with reference to a pre-determine optimum power supply level.

8. The ring laser gyroscope of claim 1, including:
   feedback means for regulating said Radio-Frequency cavity resonator to provide a stable radio frequency signal to said helical coil within a predetermined frequency and power range;
   whereby, excitation is lowered with minimal power dissipation and radio frequency interference.

9. The ring laser gyroscope of claim 8, wherein:
   said feedback means for regulating said Radio-Frequency cavity resonator includes:
   photodetection means for controlling and stabilizing the power provided to said Radio-Frequency cavity resonator; and,
   frequency control means for locking in the Radio-Frequency cavity resonator at a stable frequency.

10. In a split gain multi-mode ring laser gyroscope, including a resonant cavity defining a cloed out-of-plane optical path having a gain medium therein, comprising:
    an optical pathway having at least four legs;
    at least on of said legs of said optical pathway being carved out to form an exposed leg that is integral with a ringe laser gyroscope frame;
    said exposed leg having a radio frequency helical coil wound around its length;
    said radio frequency helical coil surrounded by a closed resonant shield forming a resonant cavity around said radio frequency coil;
    a permanent magnet surrounding said resonator shield, said coil and said resonator shield being concentric within said permanent magnet;
    whereby, a radio frequency-excited split gain multi-mode ring laser gyroscope is provided where a permanent magnet necessary to achieve split gain within the ring laser gyroscope is positioned along the same axis as the radio frequency helical coil and closed resonant shield so that the excited active medium which arises is confined to the length of said permanent magnet.

11. A ring laser gyroscope comprising:
    a resonant cavity defining a closed optical path having a gain medium therein;
    a closed Radio-Frequency cavity resonator which applies a radio frequency signal for exciting discharge of the gain medium, including:
    a helical coil surrounding a portion of said closed optical path;
    said helical coil contained within an enclosed conductive resonator shield;

an RF oscillator connected to said closed Radio-Frequency cavity resonator to supply radio frequency signals to said resonant cavity;

means for regulating said RF oscillator to provide a radio frequency signal to said helical coil within a predetermined range;

said regulating means including frequency control means further comprising frequency detection coupling and amplification means coupled to phase lock loop means, said phase lock loop means controlling regulation of frequency provided by said RF oscillator to said helical coil; and means for controlling power provided to said closed Radio-Frequency cavity resonator including photodetection means coupled to a signal comparator means, said signal comparator means adjusting an attenuator means with reference to a pre-determined optimum power supply level;

whereby, discharge of the gain medium of the ring laser gyroscope is achieved.

* * * * *